United States Patent
Wagner

(10) Patent No.: US 9,573,426 B2
(45) Date of Patent: Feb. 21, 2017

(54) SENSOR DEVICE FOR SENSING AND WIRELESS TRANSMISSION OF TIRE PRESSURE HAVING A PROGRAMMABLE INTERFACE

(71) Applicant: HUF HÜLSBECK & FÜRST GMBH & CO. KG, Velbert (DE)

(72) Inventor: Markus Wagner, Ludwigsburg (DE)

(73) Assignee: Huf Huelsbeck & Fuerst GmbH & Co. KG, Velbert (DE)

( * ) Notice: Subject to any disclaimer, the term of this patent is extended or adjusted under 35 U.S.C. 154(b) by 0 days.

(21) Appl. No.: 14/911,193

(22) PCT Filed: Aug. 5, 2014

(86) PCT No.: PCT/EP2014/066834
§ 371 (c)(1),
(2) Date: Feb. 9, 2016

(87) PCT Pub. No.: WO2015/022237
PCT Pub. Date: Feb. 19, 2015

(65) Prior Publication Data
US 2016/0176248 A1    Jun. 23, 2016

(30) Foreign Application Priority Data
Aug. 13, 2013 (DE) .................. 10 2013 108 749

(51) Int. Cl.
*B60C 23/02*     (2006.01)
*B60C 23/04*     (2006.01)

(52) U.S. Cl.
CPC ....... *B60C 23/0455* (2013.01); *B60C 23/0471* (2013.01); *B60C 23/0494* (2013.01)

(58) Field of Classification Search
None
See application file for complete search history.

(56) References Cited

U.S. PATENT DOCUMENTS 4,787,243 A * 11/1988 Gaucher .................. G08G 1/02
                                                  200/86 A
6,386,023 B1 * 5/2002 Sajna ..................... H01H 13/18
                                                  73/146

(Continued)

FOREIGN PATENT DOCUMENTS

DE         101 50 760 A1     8/2002
DE    10 2004 040 790 A1     3/2006

(Continued)

OTHER PUBLICATIONS

International Search Report of International Application No. PCT/EP2014/066834 dated Dec. 9, 2014, 4 pages.

(Continued)

*Primary Examiner* — Peter Macchiarolo
*Assistant Examiner* — Jermaine Jenkins
(74) *Attorney, Agent, or Firm* — Fay Sharpe LLP

(57) ABSTRACT

A tire pressure measuring module for a vehicle tire includes a receiving space in which are disposed a pressure sensor, a control circuit coupled to the pressure sensor and a transmitter for wireless transmission of data from the control circuit to a vehicle side receiver. The receiving space is designed to be attached to the vehicle tire. The control circuit has programmable storage devices and a programming interface for writing on the storage device is designed with contact areas. The contact areas are galvanically contacted by contact pins of an associated programming device. The contact areas are covered by an elastic insulating layer which is designed so that it can be perforated by the contact pins.

9 Claims, 1 Drawing Sheet

(56) References Cited

U.S. PATENT DOCUMENTS

| | | | | |
|---|---|---|---|---|
| 7,743,652 B1 * | 6/2010 | Huang | ............... | B60C 23/0496 |
| | | | | 73/146.2 |
| 8,186,208 B2 * | 5/2012 | Matsumura | ......... | B60C 23/0408 |
| | | | | 73/146 |
| 8,578,767 B2 * | 11/2013 | Dussinger | .......... | B60C 23/0411 |
| | | | | 73/146.5 |
| 2008/0024287 A1 * | 1/2008 | Boyle | ................ | B60C 23/0408 |
| | | | | 340/442 |
| 2012/0050029 A1 | 3/2012 | Yu et al. | | |
| 2012/0112898 A1 * | 5/2012 | Yu | ...................... | B60C 23/0493 |
| | | | | 340/442 |
| 2012/0222477 A1 | 9/2012 | Yu et al. | | |
| 2012/0235809 A1 * | 9/2012 | Cantarelli | .......... | B60C 23/0408 |
| | | | | 340/445 |
| 2012/0262286 A1 * | 10/2012 | Ho | ..................... | B60C 23/0455 |
| | | | | 340/442 |
| 2014/0253311 A1 * | 9/2014 | Yu | ......................... | B60C 23/00 |
| | | | | 340/447 |

FOREIGN PATENT DOCUMENTS

| | | |
|---|---|---|
| EP | 2 423 008 | 2/2012 |
| EP | 2 423 008 A1 | 2/2012 |
| EP | 2 495 113 A1 | 9/2012 |

OTHER PUBLICATIONS

Written Opinion of the International Searching Authority, and English translation thereof, of International Application No. PCT/EP2014/066834 dated Dec. 9, 2014, 11 pages.

* cited by examiner

SENSOR DEVICE FOR SENSING AND WIRELESS TRANSMISSION OF TIRE PRESSURE HAVING A PROGRAMMABLE INTERFACE

BACKGROUND

The invention relates to the field of tire pressure control devices (TPMS: Tire Pressure Monitoring Systems). Tire pressure monitoring systems are known in the prior art that measure pressure data in the region of the tire valve, and transmit said data wirelessly to an evaluation device inside the vehicle. By way of example, DE 101 50 760 A1 describes a tire pressure control system of this type, which also has a tire rotation rate sensor. Systems of this type are so-called direct measurement systems; they determine the tire pressure by means of a measuring module integrated in the tire valve. A wireless communication device is likewise integrated in this assembly, and transmits the tire pressure data, along with further data, if applicable, such as temperature, to a receiver installed in the vehicle. A tire pressure measuring module of this type can be mounted in the wheel rim in the proximity of the valve, or can be incorporated structurally in the valve. The further processing of the pressure data occurs in the vehicle, and a display of the tire pressure, or a warning, results therefrom when an air pressure is below a threshold level.

There are systems of this type for various vehicle manufacturers, and also for various manufacturers of TPMS systems of this type. The tire sets, on the other hand, are offered in the market by other manufacturers, and must be combined with the wheel rims to form a reliably functioning component of the corresponding vehicle. The requirements regarding the communication protocol frequently differ between the tire pressure measuring module, thus the wireless communication unit in the wheel, and the communication unit in the vehicle, which receives the measurement value. Depending on the manufacturer, or type of vehicle, there may be different communication requirements regarding the data sequence or the data format. EP2423008A1 describes a programmable system in accordance with the preamble of this application, which allows for the adaptation of the tire pressure measuring module to different requirements. Reference is made expressly and in full to this application for a complete understanding of the present application.

The object of the invention is to create a universal device for detecting the pressure of vehicle tires, which can be easily and reliably programmed for various applications in different TPMS systems.

BRIEF SUMMARY

This object is achieved by a device having the features of Claim 1.

According to the invention, the tire pressure measuring module for a vehicle tire has a receiving space that contains a pressure sensor, a control circuit coupled to the pressure sensor, and a transmitter. The tire pressure measuring module is designed to be disposed on a vehicle tire. A valve can be coupled to the tire pressure measuring module, wherein the valve can also serve as an antenna for the transmitter of the control circuit in the receiving space. Any type of mechanically stable housing can be understood to be the receiving space, in particular housing troughs, having a defined outer shape and suitable for accommodating the aforementioned components.

The control circuit is also equipped with a programmable memory in accordance with the invention, which can store data regarding a communication protocol for the acquired data that is to be transmitted. The control circuit makes use of the programmable memory accordingly, in order to transmit the data in an appropriate manner, and in the manner required by the stored data, to the receiver in the vehicle for further processing.

The aforementioned components can be encapsulated in the receiving space in an arbitrary manner, in particular covered with a casting compound, in order to protect it against environmental effects, electrical malfunctions and moisture.

There are also contact areas formed on the tire pressure measuring module in accordance with the invention, which are provided for establishing contact in order to program the memory. The contact areas thus form an interface for making contact with a corresponding counterpart for data transmission. If the contact areas are galvanically connected to associated contacts of a programming device, thus brought into direct contact in an electrically conductive manner, the programming means can write in the programmable memory, in order to store the communication protocol and the communication format. A corresponding concept for establishing the contact with a plug-in connection can be derived from EP2423008.

In accordance with the invention, the contact areas are coated with an elastic insulating layer, which is designed such that it can be perforated by the contact pins of the programming device for programming. The contact areas are thus electrically insulated, by means of an appropriate malleable casting compound, or some other elastomer coating, for example. The insulating layer is designed, however, such that a mechanical perforation of the insulating layer by the programming device, in particular by the contact pins, is possible. Furthermore, the insulating layer is elastic, in order to enable a substantial or complete closure of the insulating layer after the programming procedure and the removal of the contact pins.

A malleable casting compound is understood to be a casting compound having a limited Shore A hardness in accordance with ISO 868 after hardening. Malleable thus means a Shore A hardness of less than 70-80. However, elastic substances, in particular, having a Shore A hardness of less than 50, or even less than 30, are also well suited thereto.

In accordance with the invention, the tire pressure measuring modules will thus come into use as universally usable tire pressure measuring modules. Depending on the type of vehicle, or the control system in the vehicle, a programming of the tire pressure measuring system is carried out by appropriately prepared programming devices prior to or during the tire fitting. For this, an interface of the programming device, having contact pins, is coupled to the tire pressure measuring module, wherein the contact pins perforate the insulation layer above the contact area of the interface to the memory of the tire pressure measuring module. A writing takes place in the memory, which occurs extremely quickly due to the galvanic coupling. Even very large data quantities can be quickly transferred to the programmable memory (e.g. a flash drive) due to the galvanic contact. A programming procedure of this type normally only takes a few seconds. After the programming is completed, the programming device is removed from the tire pressure measuring module, wherein the contact pins are again disconnected from the contact area of the tire pressure measuring module. As an elastic coating, the insulating layer on the contact area has a resiliency, and thus ensures a substantially sealed coating at the area of the elastic insulating layer that has been perforated. The advantage of the invention is that by this means, in particular, a completely encapsulated module is provided for the programming, wherein it is not necessary to open the housing or exchange memories. The programming occurs quickly and simply, and moreover, the detection module is entirely protected, both before and after the programming, against contaminants and moisture. The insulating layer serves as a two-part protective skin that can be perforated, the damage thereto, however, being essentially negligible due to the elasticity of the insulating layer. The contact pins can be shaped such, in particular, that a clean perforation and subsequent closing of the protective skin is possible. e.g. as a result of pointed ends.

Data are located in the programming device, pertaining to which vehicle system data are to be stored in the memory of the tire pressure measuring module. The selection occurs at the user end, e.g. through scanning an identifier on the vehicle. The tire pressure measuring module will then reference the data in the memory during later use, in order to carry out appropriate communication procedures with the vehicle-side control module.

The important thing is that a programming of the memory of the tire pressure measuring module is possible via a galvanic contact, thus a direct electrically conductive contact, even though the encapsulation of the device is perforated, for only a brief period, for the programming. This expands the possibilities for the programming with respect to the transference of data quantities, and increases user acceptance because a programming procedure can be carried out very quickly and with ease. This is possible because the tire pressure measuring module interface is provided with an elastic insulating layer. The perforation capacity of this coating and the elasticity result in there being only a very slight damage thereto above the contact area. These areas can optionally be provided with another protective coating after the programming, e.g. a simple adhesive sticker can be applied thereto. This has the further advantage that programmed devices can also be immediately identified as such.

Furthermore, it is possible that the module interrupts the coupling to the contact area for programming with the memory after the programming has been successfully carried out. The module can then record once, and thereafter be locked. Even when then the area in which mechanical damage has occurred is slightly contaminated, e.g. through ingress of water, this has no effect on the functioning thereof, because the contacts have been disconnected. At any rate, an impairment of the further components is securely prevented by the insulating layer.

In a preferred embodiment of the invention, the elastic insulating layer is made of a casting compound, in particular a malleable casting compound. The casting compound can be the same that also encompasses the other components of the tire pressure measuring module thereby, in particular the control circuit and the transmitter. Elastic casting compounds are available in a variety of forms in the market. Because, in this field of application for the invention, the important thing is protection against moisture and dust, and not so much against strong mechanical loads, malleable casting compounds, in particular, are ideal for this, in accordance with the invention. They can be easily perforated, and have a very low resistance to the contact pins that perforate the casting compound during the programming procedure.

It is particularly advantageous when the insulating layer is formed above the contact area as a self-repairing insulating layer. Insulating layers and casting compounds of this type are likewise known in the field, and are suitable for the use according to the invention, because after they have been perforated and the programming has been carried out, a substantial self-repair and stable closure of the encapsulation occurs automatically.

In a preferred embodiment of the invention, the contact areas are designed as contact surfaces, which can be brought into contact with the contact pins of the programming device interlace. Although other designs of the contact area, e.g. as sleeves that encompass the contact pins, can also be implemented, the design as a contact surface is particularly space-saving.

In accordance with another aspect of the invention, a system is disclosed, comprising the tire pressure measuring module according to the above description and an associated programming device. The programming device has numerous contact pins, disposed at a spacing to one another, and fixed in place in relation to one another. Fixed in place in relation to one another means, in this context, that the contact pins protrude from a common plane, but are disposed at fixed positions in the plane, thus maintaining an orientation of the pins in relation to one another in the radial direction. This radial orientation of the contact pins in relation to one another corresponds to the positioning of the associated contact area inside the receiving space of the tire pressure measuring module. If the programming device is then placed in the correct orientation above the tire pressure measuring module, the contact pins of the programming device then lie in the correct allocation above the contact areas of the interface for programming the memory in the tire pressure measuring module. The contact pins are disposed in the axial direction such that they end in the same plane, corresponding to the positioning of the contact area in the tire pressure measuring module, or are offset in relation to one another, depending on whether the contact areas in the tire pressure measuring module lie in the same plane, or are disposed such that they are offset to one another.

For a simple programming, the receiving space of the tire pressure measuring module and the programming device are preferably shaped or contoured as precisely fitting counterparts, such that the programming device can be placed easily on the tire pressure measuring module, or can be placed therein, in order to enable a secure contact by the contact pins to the associated contact areas in the tire pressure measuring module. By way of example, the programming device can have a suitable receiving space or stops, into which the tire pressure measuring module is placed, or on which the tire pressure measuring module is placed. The orientation of the contact areas in relation to the receiving space on the part of the tire pressure measuring module, and the orientation of the contact pins to the outer contours of the programming device ensures that a correct allocation of the contact pins to the respective contact areas occurs, when the programming device with the contact pins is moved in relation to the tire pressure measuring module in order to perforate the insulating layer.

In a further preferred design, the contact pins are spring-supported. By this means, it is ensured that, even with production tolerances or slight misalignments in the contact, all of the contacts are established. The spring suspension is to be configured such that the spring constant always enables a perforation of the casting compound. On the other hand, the maximum force acting on the contact area can be delimited through the selection of the spring force.

The programming device can also have receiving spaces thereby, for example, in which numerous tire pressure measuring modules can be placed simultaneously, e.g. four receiving spaces for the simultaneous programming of four tire pressure measuring modules.

BRIEF DESCRIPTION OF THE DRAWINGS

The invention shall now be explained in greater detail based on the attached drawings.

DETAILED DESCRIPTION

Figure 1A:
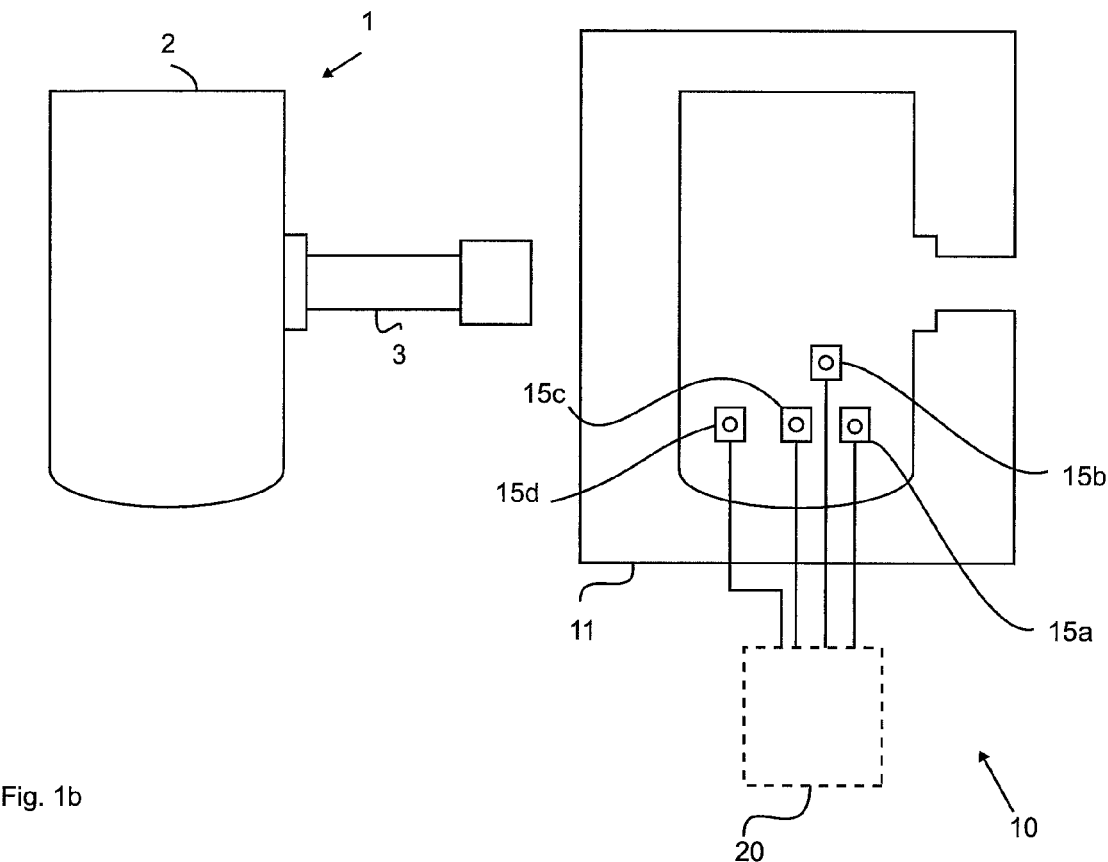
FIG. 1a shows a schematic depiction of a tire pressure measuring module and an associated programming device.

An exemplary embodiment of the combination according to the invention of the tire pressure measuring module and the programming device is shown in FIG. 1a. A tire pressure measuring module 1 has a receiving space 2, which is designed as a closed shell in the depicted view from above, of which only the bottom can be seen here. The tire pressure measuring module 1 also has a valve 3, which is designed for filling a vehicle tire, and furthermore functions as an antenna for the radio communication of the tire pressure measuring module 1. The valve 3 normally extends through a hole in the wheel rim of a wheel after the fitting thereto. The tire pressure is detected in the tire pressure measuring module 2, as is also the temperature, by means of pressure and temperature sensors. The valve 3 can be coupled to the receiving space 2, and can be decoupled therefrom, such that different valves can be attached at the receiving space to the components therein. This fundamental construction is known from available tire pressure monitors systems (TPMS).

The components of the tire pressure measuring module disposed in the receiving space, in particular the pressure sensors, control circuit and programming interface, shall be explained below in reference to the next Figure.

Furthermore, FIG. 1a shows a programming device 10. The programming device 10 has a positioning receiving space 11 in which the tire pressure measuring module 1 can be placed. If the tire pressure measuring module 1 is placed in the recess of the positioning receiving space 11, then the tire pressure measuring module is located in a correct orientation for programming. Contact pins 15a, 15b, 15c, and 15d are formed on the bottom of the receiving space 11. The contact pins extend upward from a base, toward the receiving space. The contact pins are coupled to a programming electronics system 20 by means of electrical conductors. The programming electronics system 20 can be a special electronics system or a conventional computer device (e.g. a laptop or tablet). In order to connect it, the programming device 20 can also be connected via typical interfaces, e.g. USB interfaces, to the contact pins 15a-15d, wherein then, for example, a plug-in connection is placed therebetween as a coupling.

Figure 1B:
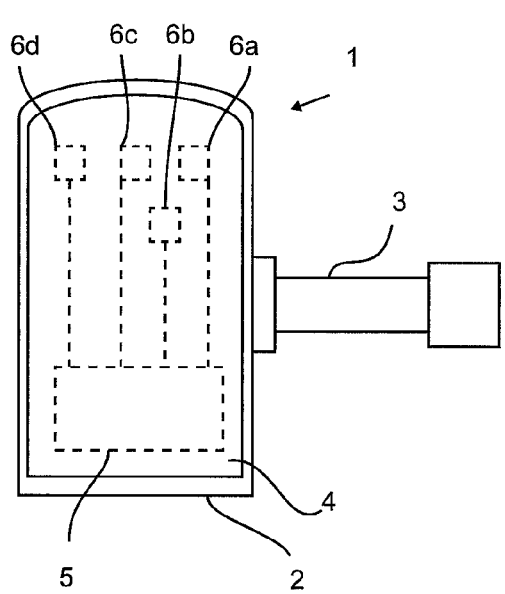
FIG. 1b shows the tire pressure measuring module from FIG. 1a in a view from below.

The undersurface of the tire pressure measuring module 1 is shown in reference to FIG. 1b. The undersurface of the receiving space is shell-shaped, and filled with an elastic sealing compound 4. The elastic sealing compound 4 encapsulates the components lying inside the receiving space 2 against moisture and environmental effects. The elastic sealing compound covers both a control device 5 as well as contact surfaces 6a, 6b, 6c, and 6d thereby. These contact surfaces are coupled to the, likewise encapsulated, control device 5 via electrical lines. The control device 5 is equipped with storage devices that can be programmed via the contact surfaces 6a-6d.

Both the control device 5 as well as the circuit surfaces 6a-6d and the associated lines are depicted with broken lines, because they are covered by the elastic casting compound 4.

The elastic casting compound is designed in this example as a self-repairing casting compound. If the tire pressure measuring module 1 is placed in the programming device in the orientation shown in FIG. 1a, and a pressure is exerted on the receiving space 2, then the contact pins 15a-15d perforate the elastic insulating layer 4 and come into contact with the contact surfaces 6a-6d. The positioning receiving space 11 ensures the proper orientation of the contact pins 15a-15d in relation to the contact surfaces 6a-6d thereby. After a galvanic contact is established between the pins and the surfaces, the programming of the storage device in the control device 5 is initiated by the device 20. A programming of this type normally requires only a few seconds time. This is the case, in particular, when only data for the transference protocol is transmitted, and the actual control program, however, is already stored in the device 5.

After completion of the programming, the tire pressure measuring module 1 can be removed from the positioning receiving space 11, wherein the contact pins are disconnected from the contact surfaces. The perforation channels in the elastic insulating material 4 close up, substantially automatically, due to the elastic design of the insulating layer. It is also possible, however, to provide a supplementary closure, by means of a sticker, for example. Because this exemplary embodiment, however, concerns a self-repairing insulating layer, a liquid barrier is again established by the insulating layer 4 after a few hours.

The advantage of this invention is that a standardized tire pressure measuring module 1 can be provided, requiring no separate provisioning, depending on the programming of the memory. By way of example, a garage can stockpile a number of tire pressure measuring modules, and program these as needed. The actual programming procedure ensures that the programming device is used in an extremely clean manner, and is also adapted to the rough garage conditions. Even in an environment exposed to a great deal of contaminants, or moisture, the programming can be carried out without difficulty, because even during the entire programming procedure an encapsulated connection is obtained between the tire pressure measuring module and its contact areas, and the programming device. The elastic insulating layer encompasses the contact pins during the perforation of the insulating layer, and prevents an ingress of undesired foreign matter or fluids. After the programming has been completed, and when the contact pins are removed, the elastic insulating layer substantially closes up, such that there is not technological impairment of the device during the entire time period.

The important thing is that, in accordance with the invention, an elastic insulating layer is used for a programming interface, which allows for a programming of a tire pressure measuring device without difficulties, and without the danger of programming for a different model, in a simple and quick manner.

The invention claimed is:

1. A tire pressure measuring module for a vehicle tire, wherein the tire pressure measuring module has a receiving space, wherein, disposed in the receiving space, are:

a pressure sensor, a control circuit coupled to the pressure sensor, and a transmitter, designed for wireless transmission of data from the control circuit to a vehicle-side receiver, wherein the receiving space is designed to be attached to the vehicle tire, wherein the control circuit includes a programmable storage device, that a programming interface for writing on the storage device is designed with contact areas, wherein the contact areas are provided for contact pins of an associated programming device to make direct electrical contact, wherein the contact areas are covered with an elastic insulating layer, which is adapted to be perforated by the contact pins of the associated programming device, wherein the associated programming device has a plurality of contact pins that are aligned and spaced apart from one another, and are fixed with respect to one another, wherein the contact pins are arranged in their positions in relation to one another according to the contact areas of the tire pressure measuring module, such that each of the contact pins contacts an associated contact of the tire pressure measuring module when the tire pressure measuring module and the programming device are moved with respect to one another such that the contact pins perforate the insulating layer.

2. The tire pressure measuring module according to claim 1, wherein the elastic insulating layer is made of a casting compound, in particular a malleable casting compound with a Shore A hardness of 80 or less.

3. The tire pressure measuring module according to claim 2, wherein the malleable casting compound has a Shore A hardness of 50 or less.

4. The tire pressure measuring module according to claim 2, wherein the malleable casting compound has a Shore A hardness of 30 or less.

5. The tire pressure measuring module according to claim 1, wherein the insulating layer is designed as a self-repairing insulating layer.

6. The tire pressure measuring module according to claim 1, wherein the contact areas are designed as contact surfaces.

7. The system according to claim 1, wherein the programming device and the receiving space of the tire pressure measuring module are shaped or contoured as accurately-fitting counterparts, such that a perforation of the insulating layer is only possible when the contact pins are oriented over the contact areas.

8. The system according to claim 1, wherein the contact pins are mounted elastically in an axial direction, such that a uniform and simultaneous contacting of the contact areas is ensured.

9. A tire pressure measuring module for an associated vehicle tire, the tire pressure measuring module comprising:
a housing including a receiving space, wherein, disposed in the receiving space, are a pressure sensor, a control circuit coupled to the pressure sensor, and a transmitter, designed for wireless transmission of data from the control circuit to an associated vehicle-side receiver,
wherein the housing is designed to be attached to the associated vehicle tire,
wherein the control circuit includes a programmable storage device,
wherein a programming interface for writing on the storage device is designed with at least one contact area, wherein the at least one contact area is provided for a galvanic contacting via at least one contact pin of an associated programming device,
wherein the contact area is covered with an elastic insulating layer, which is adapted to be perforated by the at least one contact pin of the associated programming device for programming by the associated programming device wherein the associated programming device has a plurality of contact pins that are aligned and spaced apart from one another, and are fixed with respect to one another, wherein the contact pins are arranged in their positions in relation to one another according to the contact areas of the tire pressure measuring module, such that each of the contact pins contacts an associated contact of the tire pressure measuring module when the tire pressure measuring module and the programming device are moved with respect to one another such that the contact pins perforate the insulating layer.

* * * * *